(12) United States Patent
Wang et al.

(10) Patent No.: US 10,939,124 B1
(45) Date of Patent: Mar. 2, 2021

(54) FILTERING METHOD FOR INTRA-FRAME AND INTER-FRAME PREDICTION

(71) Applicant: PEKING UNIVERSITY SHENZHEN GRADUATE SCHOOL, Shenzhen (CN)

(72) Inventors: Ronggang Wang, Shenzhen (CN); Kui Fan, Shenzhen (CN); Ge Li, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/645,618

(22) PCT Filed: Sep. 25, 2018

(86) PCT No.: PCT/CN2018/107208
§ 371 (c)(1),
(2) Date: Mar. 9, 2020

(87) PCT Pub. No.: WO2019/105120
PCT Pub. Date: Jun. 6, 2019

(30) Foreign Application Priority Data

Nov. 29, 2017 (CN) .......................... 201711224118.2

(51) Int. Cl.
*H04N 11/02* (2006.01)
*H04N 19/159* (2014.01)
(Continued)

(52) U.S. Cl.
CPC ......... *H04N 19/159* (2014.11); *H04N 19/117* (2014.11); *H04N 19/147* (2014.11); *H04N 19/176* (2014.11)

(58) Field of Classification Search
CPC .................................................... H04N 19/159
(Continued)

(56) References Cited

U.S. PATENT DOCUMENTS

| 5,867,602 A * | 2/1999 | Zandi | G06F 17/148 |
| | | | 375/E7.016 |
| 6,359,928 B1 * | 3/2002 | Wang | H04N 19/147 |
| | | | 375/240.05 |

(Continued)

FOREIGN PATENT DOCUMENTS

| CN | 103404151 A | 11/2013 |
| CN | 107896330 A | 4/2018 |
| WO | 2017065357 A1 | 4/2017 |

*Primary Examiner* — Leron Beck
(74) *Attorney, Agent, or Firm* — Miles & Stockbridge P.C.

(57) ABSTRACT

The present application provides a filtering method for intra-frame and inter-frame prediction. For a pixel value obtained by prediction, whether to filter a prediction block is self-adaptively determined by means of an RDO decision; and a filter is established based on a generalized Gaussian distribution function, and different filters are used for prediction blocks of different sizes, and filter parameters are obtained by training the prediction blocks of each size. The method comprises performing RDO on each coding unit on a coding end, and firstly performing intra-frame prediction or inter-frame prediction on each coding unit; then filtering the prediction block using the filtering method of the present invention, and determining whether to use prediction block filtering by means of an RDO decision; on a decoding end, configuring different filtering coefficients for different prediction block sizes; and decoding according to a flag. Therefore, the problem of prediction block distortion is solved, and the prediction precision can be improved, improving the coding efficiency of an intra-frame and inter-frame prediction block.

10 Claims, 3 Drawing Sheets

(51) Int. Cl.
*H04N 19/147* (2014.01)
*H04N 19/176* (2014.01)
*H04N 19/117* (2014.01)

(58) Field of Classification Search
USPC .................................. 375/240.01–240.29
See application file for complete search history.

(56) References Cited

U.S. PATENT DOCUMENTS

| | | | | |
|---|---|---|---|---|
| 6,813,387 B1* | 11/2004 | Berkner | ............... | H04N 19/176 375/E7.075 |
| 7,499,492 B1* | 3/2009 | Ameres | ................ | H04N 19/147 375/240.12 |
| 7,956,930 B2* | 6/2011 | Sullivan | ............... | H04N 19/593 348/581 |
| 2002/0159521 A1* | 10/2002 | Yan | ..................... | H04N 19/154 375/240.03 |
| 2005/0100237 A1* | 5/2005 | Kong | .................. | G06K 9/4642 382/261 |
| 2006/0110065 A1* | 5/2006 | Huang | .................... | G06T 5/002 382/275 |
| 2008/0080615 A1* | 4/2008 | Tourapis | .............. | H04N 19/137 375/240.03 |
| 2008/0175322 A1* | 7/2008 | Lee | ...................... | H04N 19/139 375/240.16 |
| 2009/0034622 A1* | 2/2009 | Huchet | ................ | H04N 19/154 375/240.16 |
| 2009/0316793 A1* | 12/2009 | Yang | ...................... | H04N 19/82 375/240.24 |
| 2011/0069755 A1* | 3/2011 | Bethge | ................ | H04N 19/176 375/240.03 |
| 2012/0121013 A1* | 5/2012 | Lainema | ................ | H04N 19/80 375/240.12 |
| 2012/0140821 A1 | 6/2012 | Drugeon et al. | | |
| 2013/0114708 A1* | 5/2013 | Van der Auwera | ......................... | H04N 19/593 375/240.12 |
| 2013/0308709 A1* | 11/2013 | Norkin | ................ | H04N 19/146 375/240.25 |
| 2014/0254928 A1* | 9/2014 | Tsai | ..................... | H04N 19/117 382/166 |
| 2015/0023405 A1* | 1/2015 | Joshi | .................... | H04N 19/593 375/240.02 |
| 2016/0316202 A1 | 10/2016 | Matsuo et al. | | |
| 2016/0360235 A1* | 12/2016 | Ramasubramonian | ...................... | H04N 19/86 |
| 2017/0237981 A1 | 8/2017 | Karczewicz et al. | | |

* cited by examiner

FILTERING METHOD FOR INTRA-FRAME AND INTER-FRAME PREDICTION

CROSS-REFERENCE TO RELATED APPLICATIONS

This application is a national stage filing under 35 U.S.C. § 371 of PCT/CN2018/107208, filed on Sep. 25, 2018 which claims priority to CN Application No. 201711224118.2, filed on Nov. 29, 2017. The applications are incorporated herein by reference in their entirety.

FIELD

The invention relates to an area of video coding, and in particular, relates a filtering method for intra-frame and inter-frame prediction, which can be used to filter intra prediction blocks and inter prediction blocks, enhance the accuracy of prediction, and thereby improve encoding efficiency.

BACKGROUND

Prediction filtering technology is a very effective coding tool for optimizing the boundaries of prediction blocks, which can effectively alleviate distortion at the boundaries of prediction blocks.

In the High Efficiency Video Coding (HEVC) standard, the existing method uses two intra prediction boundary filter technologies. One is for the DC (Direct Current) prediction mode (DC prediction mode), using a two-tap filter (filter coefficient [1/43/4]) for the first row and first column of the intra prediction block Filtering; the other is to filter the first row of horizontal prediction mode and the first column of vertical prediction mode for horizontal and vertical prediction modes.

The main shortcomings of the above filtering techniques include the following:

(1) The above existing filtering technologies only target a few intra prediction modes, and the filtering range is very limited, so the performance of the prediction filtering technology is limited to a certain extent;

(2) These filtering techniques do not make full use of the spatial correlation between pixels to reduce prediction distortion;

(3) These filtering techniques are only used for the intra prediction part and do not consider the case of inter prediction.

SUMMARY

In order to overcome the shortcomings of the prior art, the present application provides a filtering method for intra-frame and inter-frame prediction, the problem of prediction block distortion is solved, and the prediction precision can be improving the coding efficiency of an intra-frame and inter-frame prediction block.

The technical solution provided by the present invention is:

A filtering method for intra-frame and inter-frame prediction, which adaptively selects whether to filter prediction blocks through Ratedortion Optimization (RDO) decision. The filter used in this method is established based on the generalized Gaussian distribution function. Different sizes of prediction blocks are used. The filter parameters are obtained by training the prediction blocks of various sizes. Increasing prediction accuracy and encoding efficiency of intra- and inter-prediction blocks; including the following steps:

1) Performing rate-distortion optimization on each coding unit (Codingunit, CU) on the coding end, and perform the following operations:

11) First, perform intra prediction or inter prediction on each coding unit (Codingunit, CU);

12) The prediction method is used to filter the prediction block, and the filtering specifically includes the following process:

First, obtain a reconstructed pixel point adjacent to the current prediction block from a coding unit (that is, a reconstructed coding unit) that has been encoded as a reference pixel point for filtering;

After that, the reference pixel required for filtering are selected according to the prediction mode. If it is an intra coding unit (Intra CU), the reference pixel used for filtering is selected according to the prediction mode of the current intra coding unit; if it is an inter coding unit (Inter CU), all the adjacent reference pixels on the left of and above the current inter prediction block are used. Adjacent reference pixels.

Finally, according to the size of the prediction block, filter coefficients are selected, and the current prediction block is filtered using reference pixels to obtain new prediction values;

13) determining whether to use prediction block filtering (that is, the filtering method provided by the present invention) through RDO decision; for each coding unit transmits a 1-bit flag to the bitstream to identify whether prediction block filtering is used;

2) on the decoding end, for each coding unit, read the 1-bit flag in the bitstream and decode according to the flag; perform the following steps:

21) first, perform intra prediction or inter prediction on each coding unit (Codingunit, CU);

22) determining whether the decoder uses prediction block filtering according to the 1-bit flag read from the code stream;

23) if prediction block filtering is used, filtering the prediction blocks using the filtering method proposed by the present invention includes the following process:

first, obtain a reconstructed pixel point adjacent to the current prediction block from the reconstructed coding unit as reference pixels point for filtering;

after that, the reference pixel required for filtering are selected according to the prediction mode. If it is an intra coding unit (Intra CU), it selects the reference pixels for filtering according to the prediction mode of the current intra coding unit; if it is an inter coding unit (Inter CU), all the adjacent reference pixels on the left of and above the current inter prediction block are used.

finally, according to the size of the prediction block, filter coefficients are selected, and the current prediction block is filtered using reference pixels to obtain new prediction values;

the core of the present invention is to filter the pixel values obtained after prediction, including processing on the encoder and the decoder.

Specifically, at the encoding end, in each coding unit (Coding unit, CU) performing a Ratedortion Optimization (RDO) process, it is necessary to try to perform prediction block filtering, and then determine whether to use the prediction block proposed by the present invention through RDO. Filtering method (if predictive block filtering does not bring gain, do not use predictive block filtering). The coding unit needs to transmit a 1-bit flag to the bitstream to identify whether the prediction block filtering method is used. On the decoding end, the 1-bit flag in the bitstream is read. According to the meaning of the flag, the decoder decides whether to use the prediction block filtering.

The prediction block filter proposed by the present invention is a three-tap filter, and the filter can be expressed as shown in Formula 1:

$$P'(x,y)=f(x)\cdot P(-1,y)+f(y)\cdot P(x,-1)+(1-f(x)-f(y))\cdot P(x,y)$$
$$0\leq x,y<N \quad \text{Formula 1}$$

wherein, f(x) and f (y) are filter coefficients of these two reference pixels, respectively; P (x, y) is the predicted pixel point obtained after the prediction; P'(x, y) is the pixel point after the prediction block filtering; x, y are the coordinates within the prediction block, and x=0 means the first column in the prediction block, y=0 indicates the first row in the prediction block. N is the size of the current prediction block.

In particular, when f (y) is attenuated to 0, Formula 1 degrades into a two-tap filter, as shown in Formula 2. When f (x) is attenuated to 0, Formula 1 also degrades into a two-tap filter, as shown in Formula 3:

$$P'(x,y)=f(x)\cdot P(-1,y)+(1-f(x))\cdot P(x,y), x<N \quad \text{Formula 2}$$

$$P'(x,y)=f(y)\cdot P(x,-1)+(1-f(y))\cdot P(x,y), y<N \quad \text{Formula 3}$$

For convenience, the above two filters can be expressed uniformly using Formula 4.

$$p'(x)=f(x)\cdot p(-1)+(1-f(x))\cdot p(x) \quad \text{Formula 4}$$

Where p (x) is the pixel value obtained after prediction, p'(x) is the pixel point after prediction block filtering, p (−1) is the reference pixel point used in prediction block filtering, and x is the current pixel value the distance to the boundary of the prediction block.

The prediction block filter f proposed by the present invention uses filter coefficients based on a generalized Gaussian distribution function, as shown in Formula 5:

$$f(x) = a\cdot t^{-\frac{x^c}{b}}, x=0, 1, \ldots, N \quad \text{Formula 5}$$

wherein, a, b, c, and t are parameters of the generalized Gaussian distribution function, and x represents the distance from the current prediction value to the boundary. t is a constant, and t can be set to 2 in the present invention. For different prediction block sizes, the present invention designs different filter coefficients. The filter parameters a, b, and c of each prediction block can be obtained by establishing a least squares relationship between the filtered prediction value and the original pixel.

Compared with the prior art, the beneficial effects of the present invention are:

The invention provides a filtering method for intra prediction and inter prediction, which is used to effectively solve the problem of prediction block distortion, and can increase the prediction accuracy and the encoding efficiency of the prediction block. Specifically, the technical advan flags of the present invention are embodied in the following aspects:

The present invention determines whether to use prediction block filtering through RDO decision, which is equivalent to adaptively selecting whether to filter the prediction block. Since not every prediction block is suitable for filtering, the practicality and robustness of filtering technology can be increased through RDO decision.

In addition, the filter proposed by the present invention can be applied to all intra-frame and inter-frame prediction modes, which greatly enhances the influence range of the prediction block filter and improves the effectiveness of prediction filtering.

In addition, the present invention proposes to use filter coefficients to establish based on a generalized Gaussian distribution function, and the generalized Gaussian distribution function is very flexible, and can be converted into a power exponential function, a Gaussian function, and a uniform distribution function by changing parameters. Therefore, the filter in the present invention can cover a plurality of different types of filter coefficients, and can better fit the spatial correlation between pixel values. In addition, different filter coefficients can be designed for different intra prediction modes, inter prediction modes, and prediction block sizes, and better filtering effects can be obtained.

DETAILED DESCRIPTION OF EMBODIMENTS

Hereinafter, the present disclosure is further described through the embodiments, but the scope of the present disclosure is not limited in any manner.

The present disclosure provides an effective prediction filtering method, which adaptively selects whether to filter the prediction block through RDO decision-making; the proposed prediction block filtering technology filters the prediction block after intra prediction or inter prediction. The filter coefficient of the present invention is established based on a generalized Gaussian distribution function; different size prediction blocks can use different filters, for different prediction block sizes, different parameters of the generalized Gaussian distribution function can be obtained through training; The invention can resolve distortion of the prediction blocks, and prediction precision and encoding efficiency of prediction blocks can be improved.

Figure 1:
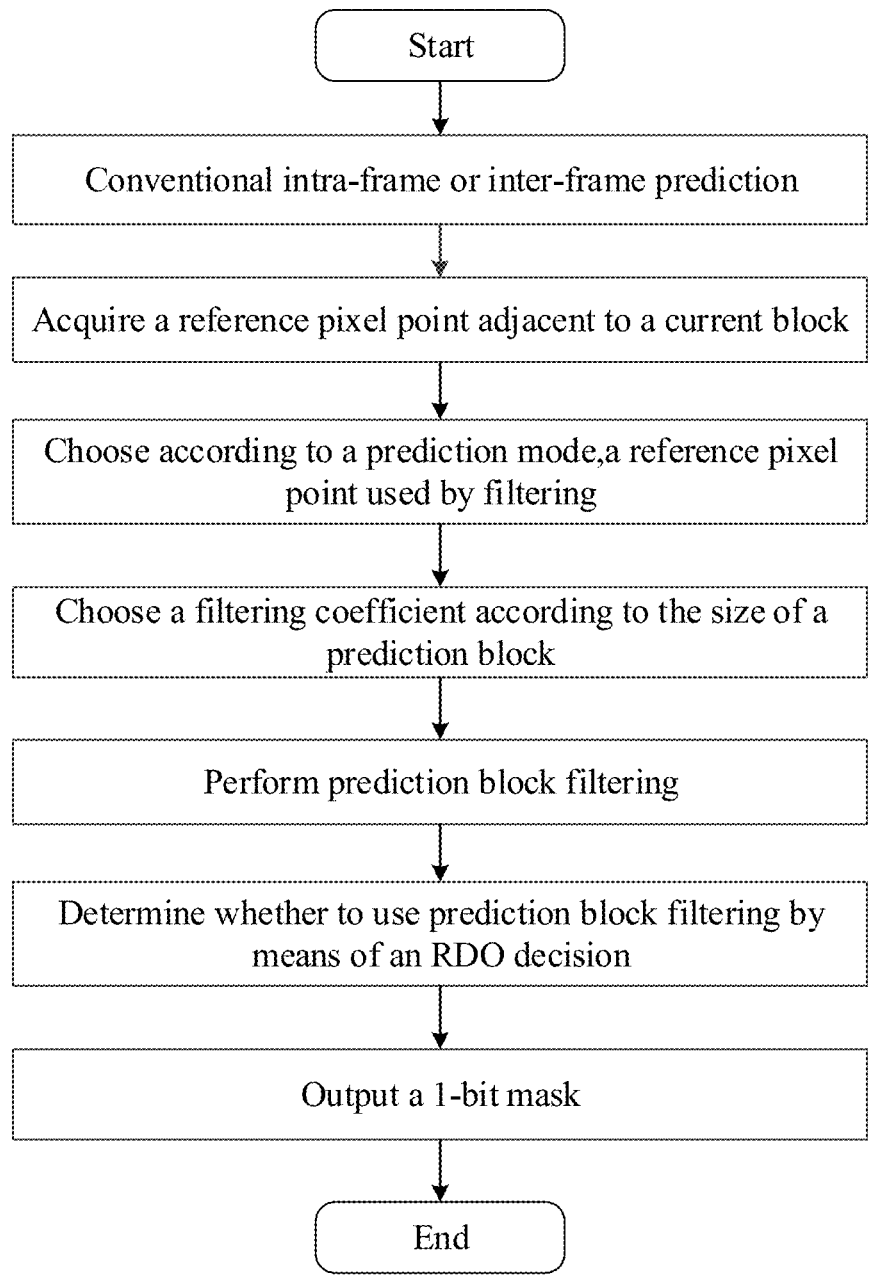
FIG. 1 is a flowchart of encoding of a coding unit (CU) of the present application.

FIG. 1 is a flowchart of encoding of a coding unit (CU) of the present application. For a coding unit, firstly perform regular prediction (that is, the intra or inter prediction method already used by existing encoders). Subsequently, a reconstructed pixel point adjacent to the current prediction block is obtained from the already-reconstructed coding unit, and the reconstructed pixel point is used as a filtered reference pixel point. According to the prediction mode, the reference pixel required for filtering are selected, the filter coefficients are selected according to the size of the prediction block, and the prediction block is filtered using the filtering technology proposed by the present invention to obtain a new prediction value. Subsequently, use rate-distortion optimization (RDO: Rate-distortion optimization) to select whether to use prediction block filtering, and output a 1-bit flag to the code stream.

Figure 2:
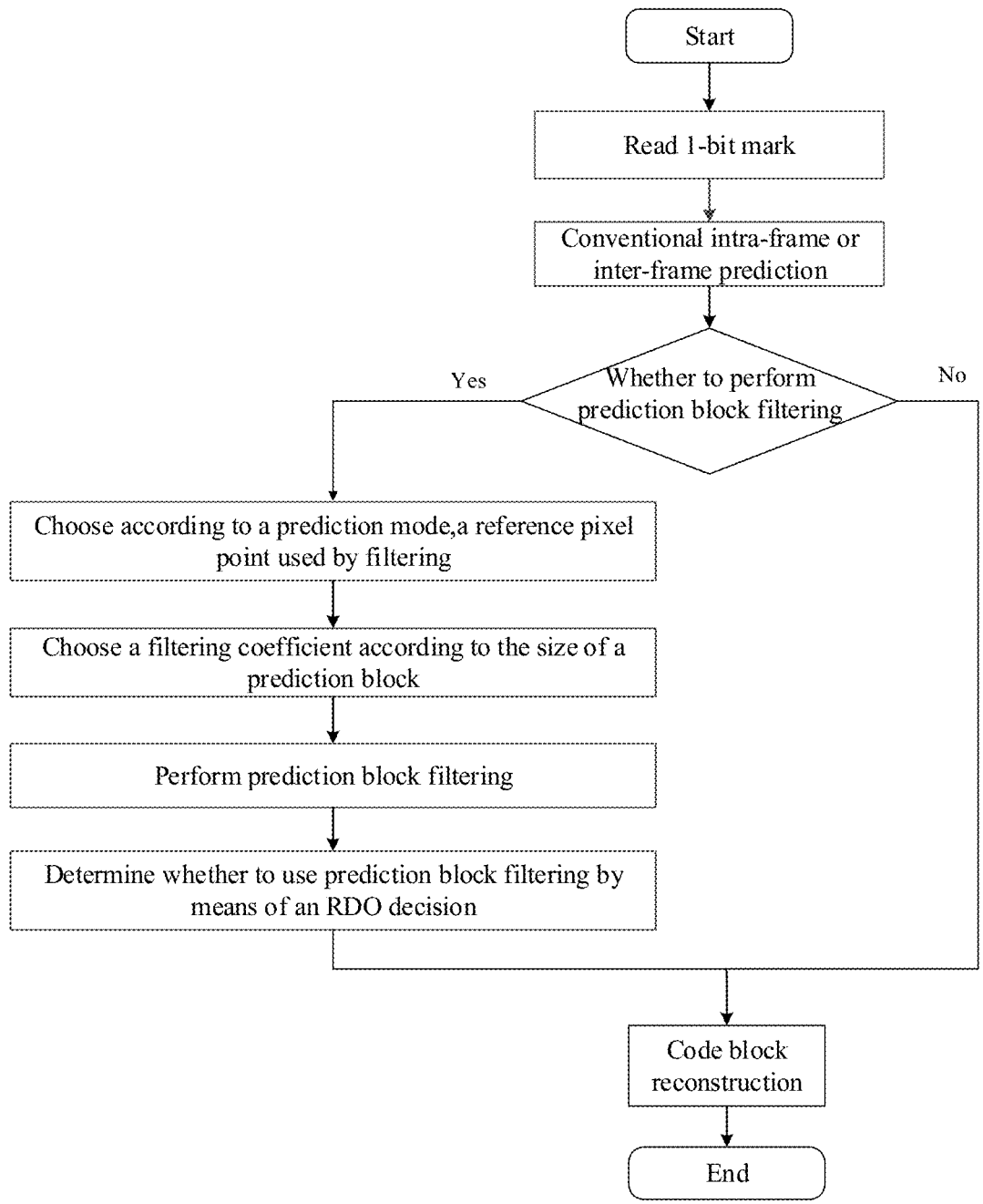
FIG. 2 is a flowchart of decoding of a coding unit (CU) of the present application.

FIG. 2 is a flowchart of decoding of a coding unit (CU) of the present application. For a coding unit, firstly read the 1-bit flag, then perform conventional intra or inter prediction. Then, whether to perform prediction block filtering is determined according to the value of the read flag. If filtering is not required, the reconstruction of the coding block can be performed directly. Otherwise, obtain a reconstructed pixel point adjacent to the current prediction block from the already-reconstructed coding unit as a filtered reference pixel point. The reference pixels required for filtering are selected according to the prediction mode, the filter coefficients are selected according to the size of the prediction block, and the prediction block is filtered using the filtering technology proposed by the present invention to obtain new prediction values, and then the coding block is reconstructed.

The prediction block filter proposed by the present invention uses a filter coefficient based on a generalized Gaussian distribution function. Designed different filtering strengths for different prediction block sizes. The filter parameters a, b, and c of each prediction block are obtained by establishing a least squares relationship between the filtered prediction value and the original pixel.

Firstly, we establish the relationship of the least squares method, as shown in Formula 6.

$$G(n) = \sum_{0}^{n} (p'(x) - I(x))^2 \qquad \text{Formula 6}$$

Where I (x) is the original pixel value, and G (n) represents the squared difference between the filtered predicted pixel value and the original pixel value. By combining Formula 4 and Formula 5, G (n) can be expressed as Formula 7. I (x)–p (x) in Formula 7 is the prediction distortion, which is represented by D (x), so the final G (n) expression can be obtained as shown in Formula 8.

$$G(n) = \sum_{0}^{n} \left(a \cdot 2^{-\frac{x^c}{b}} \cdot (p(-1) - p(x)) - (I(x) - p(x))\right)^2 \qquad \text{Formula 7}$$

$$G(n) = \sum_{0}^{n} \left(a \cdot 2^{-\frac{x^c}{b}} \cdot (p(-1) - p(x)) - D(x)\right)^2 \qquad \text{Formula 8}$$

The filter parameters a, b, and c of the prediction block are obtained by minimizing G (n). We can set G (0) equal to 0, as shown in Formula 9.

$$G(0) = (a \cdot (p(-1) - p(0)) - D(0))^2 = 0 \qquad \text{Formula 9}$$

The expression of parameter a can be obtained by solving Formula 9, as shown in Formula 10.

$$a = \frac{D(0)}{p(-1) - p(0)} \qquad \text{Formula 10}$$

For the predicted value of each position, the parameter a can be calculated. In the filter of the present invention, expectation is used as the optimal parameter estimation value, that is, the average value of all calculated parameters is used as the filter parameter. Therefore, an estimated value of the parameter a can be obtained, as shown in Formula 11.

$$\bar{a} = E\left(\frac{D(0)}{p(-1) - p(0)}\right) \qquad \text{Formula 11}$$

Similarly, the parameters b and c can be obtained by setting G (1) and G (2) to 0, respectively, as shown in Formula 12 and Formula 13.

$$G(1) = \left(\bar{a} \cdot 2^{-\frac{1}{b}} \cdot (p(-1) - p(1)) - D(1)\right)^2 = 0 \qquad \text{Formula 12}$$

$$G(2) = \bar{a} \cdot t^{-\frac{2^c}{b}} \cdot (p(-1) - p(2)) - D(2) = 0 \qquad \text{Formula 13}$$

The estimated values of parameters b and c are obtained as shown in Formula 14 and Formula 15, respectively.

$$\bar{b} = E\left(-\frac{1}{\log_2 \frac{D(1)}{\bar{a} \cdot (p(-1) - p(1))}}\right) \qquad \text{Formula 14}$$

$$\bar{c} = E\left(\log_2\left(-\bar{b} \cdot \log_t\left(\frac{D(2)}{\bar{a} \cdot (p(-1) - p(2))}\right)\right)\right) \qquad \text{Formula 15}$$

In order to apply different filters to prediction blocks of different sizes, different training data need to be used when calculating filter parameters. Specifically, the training data corresponding to the predicted block size is used to calculate the filter parameters of the size. For example, for a 32×32 prediction block, the filter parameters are calculated by inputting 32×32 encoded data (including reconstructed pixel values, predicted pixel values, and original image) into Formula 11, 14, and 15 to obtain a prediction of size 32×32 block filter parameters a, b, c.

Figure 3:
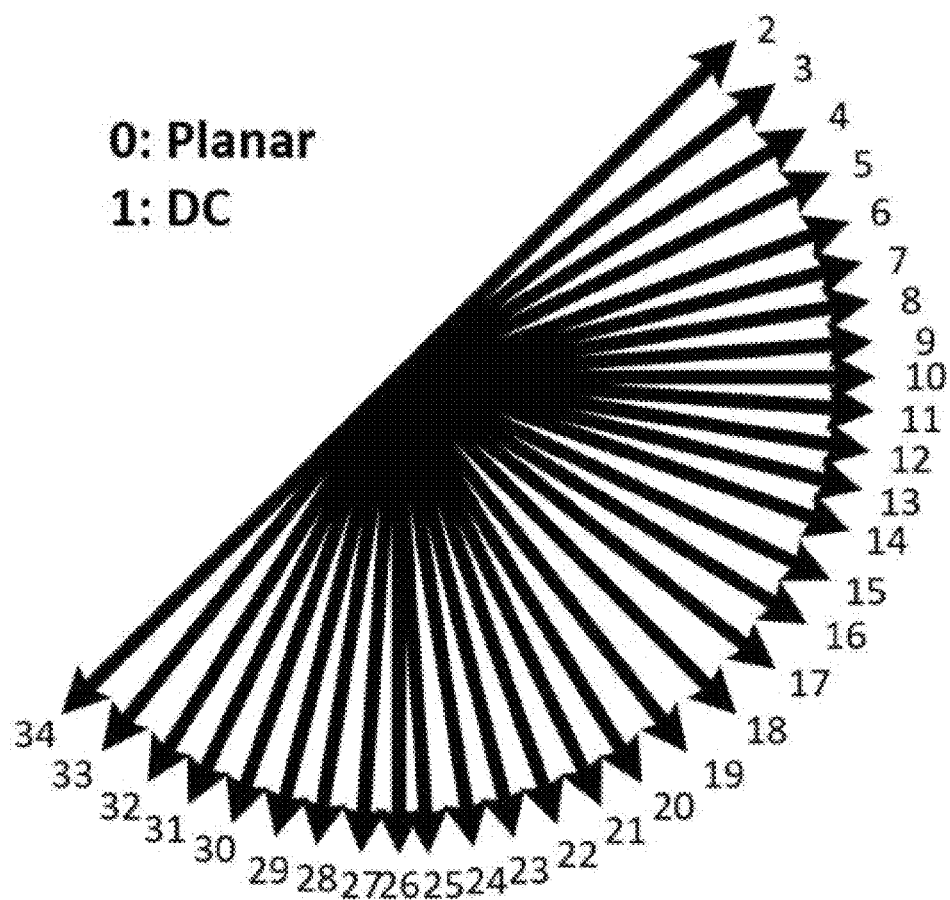
FIG. 3 is a schematic diagram of intra prediction filter coefficients in HEVC.

The filter proposed in the present invention performs different filtering operations on a specific prediction mode. Taking the intra prediction mode of HEVC in FIG. 3 as an example, in modes 2 to 17, only the prediction block is filtered using Formula 3; in modes 19 to 34, only the prediction block is filtered using Formula 2. In other frames for intra prediction mode or inter prediction block, use Formula 1 to filter.

To avoid floating-point calculations, the floating-point filter coefficients proposed in the present invention can be converted to integers, and right-shifted after filtering. Specifically, the filter coefficient may be multiplied by a power of in, and the modified prediction value may be shifted to the right by in bits after the filtering calculation. Taking Formula 4 as an example, the expression converted to integer calculation is shown in Formula 16. The value of in is related to the required calculation accuracy. The higher the required accuracy, the larger the value of in and the more accurate the calculation result.

$$p'(x) = (2^m \cdot f(x) \cdot p(-1) + (2^m - 2^m \cdot f(x)) \cdot p(x) + 2^{m-1}) \gg m \qquad \text{Formula 16}$$

It needs to be noted that the embodiments as disclosed are intended to facilitating further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims

We claim:
1. A coding method for intra-frame and inter-frame prediction, on the encoding side, rate-distortion optimization is performed for each coding unit; for the pixel values obtained after prediction, adaptively select whether to filter a prediction block through an rate-distortion optimization decision; a filter is established based on a generalized Gaussian distribution function, and different filters are used for prediction blocks of different sizes, filter parameters are obtained by training the prediction blocks of each size; it includes the following steps:
  11) performing intra prediction or inter prediction on each coding unit;
  12) filtering the prediction blocks using the filter, including the following process:
  first, obtain the reconstructed pixel adjacent to the current prediction block from the reconstructed coding unit, and use them as reference pixels for filtering;
  after that, the reference pixel required for filtering are selected according to the prediction mode: if it is an intra coding unit (Intra CU), the reference pixels for filtering are selected according to the prediction mode of the current intra coding unit; if it is an inter coding unit (Inter CU), all the adjacent reference pixels on the left of and above the current inter prediction block are used;
  finally, a filter coefficient is selected according to the size of the prediction block, and the current prediction block is filtered using the reference pixels to obtain a new prediction value; a three-tap prediction block filter is specifically used; for a prediction pixel, use two reference pixels, P (−1, y) in the same row thereof and P (x, −1) in the same column thereof, to filter; the three-tap prediction block filter is expressed as Formula 1:

$$P'(x,y)=f(x)\cdot P(-1,y)+f(y)\cdot P(x,-1)+(1-f(x)-f(y))\cdot P(x,y) \quad 0\leq x,y<N \quad \text{Formula 1}$$

wherein, f(x) and f (y) are filter coefficients of these two reference pixels, respectively; P (x, y) is the predicted pixel point obtained after the prediction; P'(x, y) is the pixel point after the prediction block filtering; x, y are the coordinates within the prediction block, and x=0 means the first column in the prediction block, y=0 indicates the first row in the prediction block; N is the size of the current prediction block;
  the prediction block filter uses filter coefficients based on the generalized Gaussian distribution function, which is expressed as Formula 5:

$$f(x)=a\cdot t^{-\frac{x^c}{b}}, \quad x=0,1,\ldots,N \quad \text{Formula 5}$$

wherein, a, b, c, and t are parameters of the generalized Gaussian distribution function; and x represents the distance from the current prediction value to the boundary; t is a constant; set different filter coefficients for different prediction block sizes;
  13) determining whether to use prediction block filtering through a rate-distortion optimization decision; for each coding unit, transmits a flag to the bitstream to identify whether prediction block filtering is used.
2. The encoding method according to claim 1, characterized in that a flag transmitted to each bit stream in each coding unit and used to identify whether prediction block filtering is used is a 1-bit flag.

3. The encoding method according to claim 1, characterized in that when the filter coefficient f (y) or f (x) of the three-tap prediction block filter is attenuated to 0, it is degraded to a two-tap filter, respectively expressed as Formula 2 and Formula 3:

$$P'(x,y)=f(x)\cdot P(-1,y)+(1-f(x))\cdot P(x,y), \quad x<N \quad \text{Formula 2}$$

$$P'(x,y)=f(y)\cdot P(x,-1)+(1-f(y))\cdot P(x,y), \quad y<N \quad \text{Formula 3}$$

Formula 2 and Formula 3 are uniformly expressed as Formula 4:

$$p'(x)=f(x)\cdot p(-1)+(1-f(x))\cdot p(x) \quad \text{Formula 4}$$

wherein, p (x) is the pixel value obtained after prediction, p'(x) is the pixel point after prediction block filtering, p (−1) is the reference pixel point used in prediction block filtering, and x is the distance from the current pixel value to the boundary of the prediction block.

4. The encoding method according to claim 1, characterized in that, in the filter coefficients based on the generalized Gaussian distribution function expressed by Formula 5, the value of the parameter t is set to 2.

5. The encoding method according to claim 1, characterized in that, for different prediction blocks, filter parameters a, b and c of each prediction block are obtained by establishing a least squares relationship between the filtered prediction value and the original pixel, thereby setting different filter coefficients for different prediction block sizes; the least squares relationship is expressed as Formula 6:

$$G(n)=\sum_{0}^{n}(p'(x)-I(x))^2 \quad \text{Formula 6}$$

wherein, I(x) is the original pixel value; G(n) represents the squared difference between the filtered predicted pixel value and the original pixel value, and is expressed as Formula 7:

$$G(n)=\sum_{0}^{n}\left(a\cdot 2^{-\frac{x^c}{b}}\cdot(p(-1)-p(x))-(I(x)-p(x))\right)^2 \quad \text{Formula 7}$$

i (x)−p (x) in Formula 7 is the prediction distortion, which is represented by D (x), and thus G (n) is represented by Formula 8:

$$G(n)=\sum_{0}^{n}\left(a\cdot 2^{-\frac{x^c}{b}}\cdot(p(-1)-p(x))-D(x)\right)^2 \quad \text{Formula 8}$$

by minimizing G (n), the filter parameters a, b, and c of the prediction block are obtained.

6. The encoding method according to claim 5, wherein G (0) is set to 0, which is expressed as Formula 9:

$$G(0)=(a\cdot(p(-1)-p(0))-D(0))^2=0 \quad \text{Formula 9}$$

the expression of parameter a is obtained by solving Formula 9, which is expressed as Formula 10:

$$a = \frac{D(0)}{p(-1) - p(0)} \qquad \text{Formula 10}$$

the parameters b and c are obtained by setting G (1) and G (2) to 0, respectively, which are expressed as Formulas 12 and 13, respectively:

$$G(1) = \left(\overline{a} \cdot 2^{-\frac{1}{b}} \cdot (p(-1) - p(1)) - D(1)\right)^2 = 0 \qquad \text{Formula 12}$$

$$G(2) = \overline{a} \cdot t^{-\frac{2c}{b}} \cdot (p(-1) - p(2)) - D(2) = 0 \qquad \text{Formula 13}$$

for each position, the parameters a, b, and c are calculated using Formula 10, Formula 12, and Formula 13, respectively.

7. The encoding method according to claim 6, wherein the expectation is used as the optimal parameter estimation value, that is, the average value of all the calculated parameters is used as the filter parameter.

8. A decoding method for intra-frame and inter-frame prediction, on the decoding end, for each coding unit, read a 1-bit flag in a bitstream and decode according to the flag; for the pixel values obtained after prediction, determine whether the decoder uses prediction block filtering according to the flags read from the bitstream; the prediction block filtering establishes a filter based on a generalized Gaussian distribution function, different prediction blocks of different sizes use different filters, and filter parameters are obtained by training prediction blocks of various sizes, it includes the following steps:
  21) performing intra prediction or inter prediction on each coding unit;
  22) determining whether the decoder uses prediction block filtering according to the flag read from the code stream;
  23) if prediction block filtering is used, filtering the prediction blocks using the filtering method includes the following process:
  first, obtain reconstructed pixel adjacent to the current prediction block from the reconstructed coding unit as reference pixels for filtering;
  after that, the reference pixels required for filtering are selected according to the prediction mode: if it is an intra coding unit, the reference pixels used for filtering are selected according to the prediction mode of the current intra coding unit; if it is an inter coding unit, all the adjacent reference pixels on the left of and above the current inter prediction block are used;
  finally, a filter coefficient is selected according to the size of the prediction block, and a reference pixel is used to filter the current prediction block using the prediction block filtering method to obtain a new prediction value;
  the prediction block filtering method specifically uses a three-tap prediction block filter, for a prediction pixel, use two reference pixels, P (−1, y) in the same row thereof and P (x, −1) in the same column thereof for filtering; the three-tap prediction block filter is expressed as Formula 1:

$$P'(x,y) = f(x) \cdot P(-1,y) + f(y) \cdot P(x,-1) + (1 - f(x) - f(y)) \cdot P(x,y)$$
$$0 \le x, y < N \qquad \text{Formula 1}$$

Wherein, f (x) and f (y) are filter coefficients of the two reference pixels, respectively; p (x, y) is the predicted pixel point obtained after prediction; p'(x, y) is the pixel point after the prediction block filtering is performed; x and y are coordinates within the prediction block, x=0 means the first column in the prediction block, and y=0 means the first row in the prediction block; N is the size of the current prediction block;
the prediction block filter uses filter coefficients based on the generalized Gaussian distribution function, which is expressed as Formula 5:

$$f(x) = a \cdot t^{-\frac{x^c}{b}}, \qquad \text{Formula 5}$$
$$x = 0, 1, \ldots, N$$

wherein, a, b, c, and t are parameters of the generalized Gaussian distribution function; x is the distance between the current prediction value and the boundary; t is a constant; different filter coefficients are set for different prediction block sizes.

9. The decoding method according to claim 8, characterized in that, for different prediction blocks, filter parameters a, b and c of each prediction block is obtained by establishing a least squares relationship between the filtered prediction value and the original pixel, therefore, different filtering coefficients are set for different prediction block sizes; the least square relationship is expressed as Formula 6:

$$G(n) = \sum_{0}^{n} (p'(x) - I(x))^2 \qquad \text{Formula 6}$$

wherein, I (x) is the original pixel value; G (n) represents the squared difference between the filtered predicted pixel value and the original pixel value, and is expressed as Formula 7:

$$G(n) = \sum_{0}^{n} \left(a \cdot 2^{-\frac{x^c}{b}} \cdot (p(-1) - p(x)) - (I(x) - p(x))\right)^2 \qquad \text{Formula 7}$$

I (x)−p (x) in Formula 7 is the prediction distortion, which is represented by D (x), and thus G (n) is represented by Formula 8:

$$G(n) = \sum_{0}^{n} \left(a \cdot 2^{-\frac{x^c}{b}} \cdot (p(-1) - p(x)) - D(x)\right)^2 \qquad \text{Formula 8}$$

by minimizing G (n), the filter parameters a, b, and c of the prediction block are obtained.

10. The decoding method according to claim 8, wherein G (0) is set equal to 0, which is expressed as Formula 9:

$$G(0) = (a \cdot (p(-1) - p(0)) - D(0))^2 = 0 \qquad \text{Formula 9}$$

the expression of parameter a is obtained by solving Formula 9, which is expressed as Formula 10:

$$a = \frac{D(0)}{p(-1) - p(0)} \qquad \text{Formula 10}$$

the parameters b and c are obtained by setting G (1) and G (2) to 0, respectively, which are expressed as Formula 12 and 13, respectively:

$$G(1) = \left(\bar{a} \cdot 2^{-\frac{1}{b}} \cdot (p(-1) - p(1)) - D(1)\right)^2 = 0 \quad \text{Formula 12}$$

$$G(2) = \bar{a} \cdot t^{-\frac{2c}{b}} \cdot (p(-1) - p(2)) - D(2) = 0 \quad \text{Formula 13}$$

for each position, the parameters a, b, and c are calculated using Formula 10, Formula 12, and Formula 13, respectively;

then use the mean of all the calculated parameters as the filter parameters.

* * * * *